Oct. 30, 1962 C. W. HUSUM 3,061,130
GASKETED CLOSURE CAP FOR GLASS CONTAINERS
Filed April 15, 1959
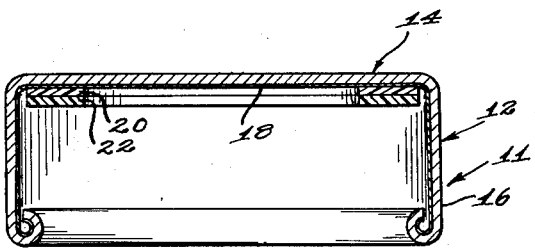
Fig. 1.
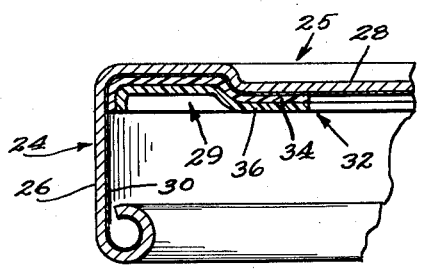
Fig. 2.
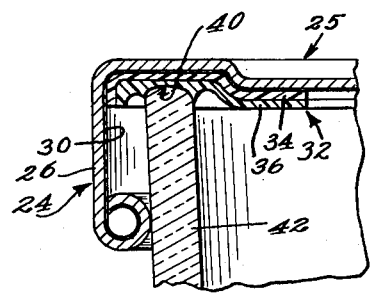
Fig. 3.
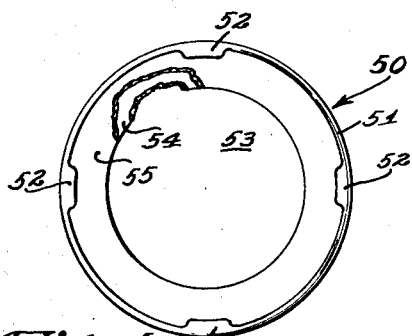
Fig. 4.
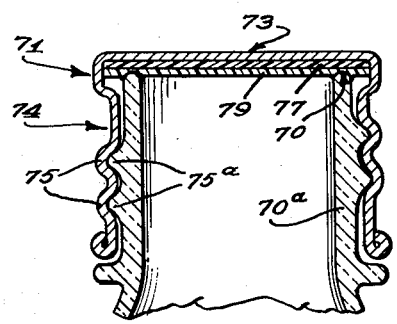
Fig. 5.
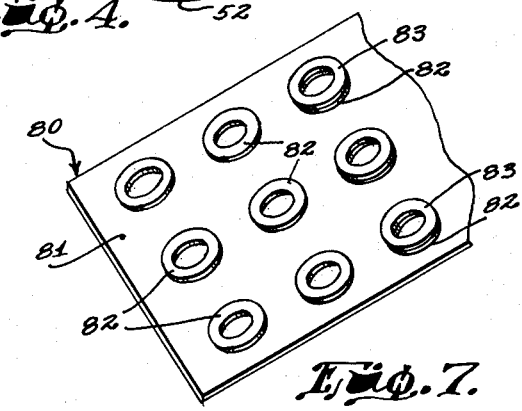
Fig. 7.
Fig. 6.
INVENTOR.
CHARLES W. HUSUM
BY Paul F. Stutz
and W. A. Schaich
ATTORNEYS United States Patent Office 3,061,130
Patented Oct. 30, 1962

3,061,130
GASKETED CLOSURE CAP FOR
GLASS CONTAINERS
Charles W. Husum, Toledo, Ohio, assignor to Owens-Illinois Glass Company, a corporation of Ohio
Filed Apr. 15, 1959, Ser. No. 806,626
9 Claims. (Cl. 215—40)

The present invention relates to a closure cap for glass containers and, more particularly, to improvements in a gasket arrangement for a closure cap for hermetically sealing glass containers.

The closure with which the present invention is concerned is generally composed of a cup-shaped shell having a flat top panel portion and a depending skirt portion, the latter including an arrangement for engaging with the glass container. This may take the form of a "lug" or the more conventional threaded skirt. As indicated, the present invention is most directly concerned with a closure cap as defined which includes a gasket formed from a so-called "plastisol" type resin paste which may be laid down on a blank of closure configuration, flowed into place within the closure shell or deposited by a silk or metal "screening" process on flat metal plate which is usually enamel lined, followed by a curing or fluxing of the deposited paste, after which the closure shell is formed.

The term "plastisols" designates resin-base pastes comprising a dispersion of finely powdered polyvinyl chloride or copolymers of vinylidene chloride, polyvinyl acetate, and acrylonitrile in a plasticizer vehicle. Various fillers, coloring agents, lubricating agents, stabilizers, and the like may also be present in the formulations. Plastisols do not contain a volatile solvent, and are formulated to a particular viscosity, by adjusting the relative proportion of plasticizer and base resin, compatible with the particular scheme selected for applying the plastisol to the base metal cap. In general, if the plasticizer is to be silk-screened in a desired pattern on a metal plate or enamel-coated metal plate, the viscosity is adjusted to be quite thin by control of the proportion of plasticizer to resin. On the other hand, if the plastisol is going to be deposited by extruding through a nozzle, then the viscosity will be desirably somewhat more viscous, again, by control of the proportion of plasticizer to resin. In any event, the deposits are subsequently heated sufficiently that the plasticizer diffuses throughout the resin particles and transforms the plastisol from a pasty mixture to a permanent rubber-like gasket. The transformation just described is usually referred to as "fluxing."

Closure caps of the general type referred to are, of course, well known and, in addition, gaskets for such closure caps, formed of plastisol materials, have been used in the art. Appreciable difficulty has been encountered, however, in the course of developing a completely acceptable gasketed closure cap which is capable of maintaining an established hermetic seal with a glass container. This difficulty is most prevalent in the attempts to package so-called hot process foods. In the packaging of such foods, the temperature maintained is generally in the range of 240° F. to 250° F. Usually, the food is introduced into the glass container, whereupon the space above the level of the food in the top of the container is filled with steam, and, at the same time, the closure cap is brought down into sealing engagement with the container. Machines are usually employed for the foregoing, and such are adjusted to forcefully tighten the closure to provide an adequate seal at the rim of the container and the gasket. It has been found that the temperature and the force employed during the application of the cap frequently result in a destruction of the gasket, as evidenced by actual cut-through of the gasket by the rim of the container. The tendency for gaskets o experience cut-through under the conditions to which they are exposed can be, to some extent, minimized by providing for increased head space in the container, or by reducing the air pressure differential between the inside and the outside of the container. This, however, is most undesirable in that it greatly increases the chance for failure of vacuum leading to contamination and possible food poisoning. If the gasket formulation is adjusted with respect to the relative proportions of resin and plasticizer to make the gasket harder, some reduction in cut-through of the gasket results. Unfortunately, however, the resulting harder gasket does not form a satisfactory hermetic seal, and loss of vacuum still occurs.

The utilization of gasketed closure caps for glass containers is further accompanied by the drawback that many efficient plasticizers for the resin system employed in making the gasket cannot be used where the ultimate use is for containing food, medicines, and the like. As a result, the scope of resin plasticizer combinations which could be used has been seriously limited.

It has also been found that some of the newly developed, highly effective plasticizers which would normally and desirably be utilized in forming the plastisol materials for forming gaskets for this use cannot be used because they solubilize the vinyl phenolic type enamel coatings which are baked on the tin-plated surface of the metal closures. Thus, in effect, it is found that such plasticizers, of which the high molecular weight, epoxy type plasticizers are examples, actually bleed or migrate from the plastisol into the underlying vinyl type enamel, and, by a solubility phenomenon, cause a separation of the enamel coating from the metal surface, which leads, of course, to ultimate destruction of the seal and the vacuum.

Accordingly, it is an object of the present invention to provide an improved gasketed closure cap which is capable of providing an efficient hermetic seal, and maintaining the seal and the vacuum conditions within the container over long periods of time.

It is another object of the present invention to provide a scheme for a stratified gasket for the closure cap of the type concerned.

It is still another object of the present invention to provide a gasketed closure cap as set forth above which is easily prepared and fabricated.

It is a principal object of the present invention to provide such a gasketed closure cap which is capable of withstanding the rigorous service conditions encountered in the automatic filling and capping operations used generally in the industry in connection with hot process foods.

The foregoing, as well as other broader objects of the present invention, will become apparent to those skilled in the art from the following detailed description, taken with the annexed sheet of drawings, on which there is presented for purposes of illustration only, several embodiments of the invention.

In the drawings:

FIG. 1 is a sectional elevation view of a gasketed closure cap in accordance with the invention.

FIG. 2 is a fragmentary sectional elevation view of another gasketed closure cap in accordance with the present invention.

FIG. 3 is similar to FIG. 2, but showing the closure cap in engagement with a glass container.

FIG. 4 is a partially broken plan view of a gasketed closure cap in accordance with this invention.

FIG. 5 is a sectional elevation view of a different type closure cap including gaskets in accordance with the present invention.

FIG. 6 is a sectional view of a rim portion of a glass container.

FIG. 7 is a perspective view of an intermediate stage of the production of gasketed closure caps in accordance with the present invention.

In its most simple embodiment, the present invention comprises a closure cap of the top-seal type, comprising a cup-shaped shell member having a top portion and a depending skirt portion, and a gasket means secured to the under surface of the flat portion, said gasket means being composed of a plurality of layers of a rubber-like plastisol, each having a preselected different hardness.

Referring now more specifically to the drawings, there is shown in FIG. 1 a closure cap 11 in accordance with the present invention, and composed of a flat top panel portion 14 and a depending skirt portion 16 which forms a hollow cup-shaped member. The numeral 18 designates an extremely thin film of a vinyl type enamel which is baked on the inner surface of the shell-like member 12, and forms a protective coating to eliminate contact between the metal and contents of the container to which the closure is applied. In accordance with general practice, the cup-shaped member is formed of a fine gauge steel, which is tin-plated on the surface which will ultimately become the inner surface of the closure cap. An annular base gasket member 20 is heat-bonded to the enamel coating 18 on the under side of the top flat portion of the closure shell. A second annular gasket member 22 is adhered to the gasket member 20 in registered relationship. As will appear hereinafter, the gasket member 20 is a vinyl-base plastisol which contains the plasticizer in rather small, effective quantities, so that the ultimate fluxed gasket in accordance with such formulation is relatively hard, while the gasket member 22 is a vinyl-base plastisol containing a greater proportion of effective plasticizer so that the ultimate fluxed gasket is relatively soft.

In FIG. 2, there is shown a slightly different type closure shell 24 having an upper top panel portion 25 and a depending skirt 26. A circular portion 28 of the top surface of the top panel 25 is recessed, and thus forms an annular channel 29 in the inner surface of the outer periphery of the closure shell. The inner surface of the closure shell is provided with a protective coating in the industry, and have been fairly universally adopted by reason of their property of insulating the tin-plated, 30 of a vinyl phenolic copolymer, having a thickness of about .0005 inch. Coatings of this type are well known inner metal surface from the corrosive food contents of the container. An annular gasket assembly 32 is located in the closure shell and extends, as viewed in section, on either side of the channel 29. The gasket assembly is formed of a first annular layer 34 of a vinyl-base plastisol of selected hardness, and a second annular layer 36 of a vinyl-base plastisol of selected hardness. The first layer 34 is formulated to be quite hard, while the second layer 36 is formulated to be relatively soft.

In FIG. 3, the gasketed closure of the invention just described is shown in sealing engagement with the rim 40 of a glass container 42. The relative softness of the second layer of vinyl-base plastisol provides the optimum seal with the rim portion of the container, even though it may possess surface defects or be otherwise non-uniform or irregular in contour. In this regard, reference may be had to FIG. 6, wherein is disclosed in enlarged form a sectional elevation view of the rim 40 of the container 42. The rim under microscopic examination is found to possess a top sealing surface having both major irregularities 40a and pits 40b. The relatively soft layer, however, is readily distortable and accommodates itself to such irregularities and pits, and thus forms a tight hermetic seal. The depending skirt portion of the closure shell, as shown, includes a "lug" type, container-engaging scheme as shown in FIG. 4. The closure cap 50 in FIG. 4 has its depending skirt 51 provided with four equally spaced, inwardly projecting lugs 52 which are adapted to engage projections integrally formed on the exterior of the glass container, and additionally serve to assist in the resealing of the cap 50 on the container for reuse after it has been removed for the first time. The base vinyl plastisol layer 54 which is relatively hard is of annular configuration and covers all of the channel surface, plus overlapping over onto the skirt portion and over onto the under side of the recess portion of the top. The second layer 55 of vinyl-based plastisol completely overlies the first layer 54, and thus shields it from contact by the contents of the container. In a similar fashion, the first or base layer prevents contact between the protective enamel 53 and the second gasket layer 55. The provision for shielding or masking the gasket layers by each other forms an important concept within the scope of the present invention.

For closure caps of relatively large size, the gaskets are desirably in the form of annular rings as described above. This, of course, saves in the amount of material used in forming the gaskets. In smaller closure caps, such as are used in narrow-necked containers such as catsup bottles, the gaskets are preferably formed in the form of circular disks. A closure cap 71 of this type is shown in FIG. 5 as composed of a flat, circular top portion 73, and a depending skirt portion 74. The skirt portion is formed with screw threads 75 thereon for engagement with corresponding threaded portions 75a on the glass containers. A circular layer 77 of a vinyl-base plastisol formulated to provide a relatively hard gasket is baked onto the previously vinyl enamel-coated under surface of the flat portion 73. The vinyl enamel coating is not shown in this FIG. 5. A second circular layer 79 of a vinyl-base plastisol formulated to provide a relatively soft gasket is baked onto the first layer. The second layer provides the sealing engagement with the rim 70 of the container 70a.

In the production of gasketed closures in accordance with this invention, utilization is made of a silk or metal screening process for deposit of the vinyl-base plastisol. Examples of formulation of vinyl-base plastisols will be given in detail hereinafter.

As indicated hereinbefore, plain rectangular steel plate which has had one surface "tinned" is used. A plate of this type is shown in FIG. 7 and identified by the reference numeral 80. The upwardly facing tinned surface 81 is, of course, first coated with a vinyl enamel which is not shown in this figure, but is discussed in further detail hereinafter. By means of a silk or metal screen, a first annular deposit or layer 82 of vinyl plastisol is laid down by "squeegeeing" the fairly thin plastisol through the fine mesh of the screen. A plurality of such are deposited on the tinned and vinyl enamel-coated surface. Subsequently, the metal blank is placed in a hot-air oven to flux or partially flux the plastisol, and bond it to the vinyl enamel. Upon removal from the oven, a second annular deposit or layer of a vinyl-base plastisol 83 is laid down directly over and in registry with the first layer deposit. As shown in FIG. 7, one row includes a second layer 83 which has been deposited by a metal screening technique. When this is completed, the metal blank is put back into the oven and baked to flux the top coat of vinyl-base plastisol and, preferably, effect a fusion between the two layers so that there is formed essentially an integral gasket possessing gradient hardness measured from the rim-contacting surface to the surface bonded to the protective enamel undercoat. It will be appreciated that in accordance with this invention, the resulting gasket of gradient hardness is softer at the rim-contacting surface, so as to be ideally suited for sealing the closure cap with the rim of the container and accommodating any and all imperfections of contour which might be contained in the rim.

At the same time, in accordance with this invention, the underlying portion of the stratified gasket is relatively hard, and, consequently, such will resist any tendency of the rim to "cut-through" the gasket and expose the metal to contact with container contents.

There will now be described, by way of example, several preferred formulations for making the base gasket layer and the top gasket layer, it being understood that such formulations as will be given are to be in the nature of teaching examples, and the invention is in no way to be considered as limited to these precise formulations.

As examples of formulations of a vinyl plastisol for forming a base layer or base gasket, reference may be had to Table I, wherein the amounts of the stated ingredients are given as parts by weight.

TABLE I

|  | A | B | C | D | E | F | G |
|---|---|---|---|---|---|---|---|
| Polyvinyl chloride [a] | 100 | 100 | 100 |  | 100 | 100 |  |
| Polyvinyl chloride [b] |  |  |  | 100 |  |  |  |
| Liquid plasticizer: |  |  |  |  |  |  |  |
| High mol. wt. epoxy type [c] |  |  |  |  | 5 | 5 |  |
| Acetyltributyl citrate [d] | 40 | 40 | 40 | 40 | 36 | 35 | 40 |
| Alkylaryl phosphate [e] | 40 | 40 | 40 | 40 | 25 | 35 | 40 |
| Filler and colorant: |  |  |  |  |  |  |  |
| Titanium dioxide [f] | 10 | 5 |  |  | 15 |  |  |
| Stabilizer: |  |  |  |  |  |  |  |
| Zinc epoxy-based organic [g] | 2 | 2 |  |  |  |  |  |
| Calcium-zinc type [h] |  |  | 2 | 2 |  |  |  |

[a] Marketed by B. F. Goodrich Rubber Company of Akron, Ohio, under the trademark "Geon."
[b] Marketed by the Bakelite Division of the Union Carbide & Chemical Corporation.
[c] Marketed by Rohm & Haas Chemical & Resin Corporation under the trademark "Paraplex" and covered in U.S. Patent No. 2,569,502.
[d] Marketed by Pfizer Chemical Company under the trademark "Citroflex".
[e] Marketed by Monsanto Chemical Company of St. Louis, Missouri, under the trademark "Santicizer", such being 2-Ethylhexyl Diphenyl Phosphate.
[f] Marketed by Titanium Pigments Corporation of New York, New York, under the trademark "Titanox".
[g] Marketed by Ferro Chemical Corporation of Bedford, Ohio, under the trademark "Ferro", such being a non-toxic calcium-zinc stabilizer.
[h] Marketed by Advance Solvent & Chemical Division of Carlisle Chemical Works, New Brunswick, New Jersey, under the trademark "Advastab", such being a soluble organo-tin sulfur containing heat and light stabilizer for chlorinated polymers.

All of the above yield a gasket-like layer of relative hardness as to resist cut-through by the rim of the glass container to which applied, even when mechanically applied using high closing torque under conditions of temperature in the range of 240° F.–260° F.

As examples of formulations of a vinyl plastisol for forming the top layer or top gasket, reference may be had to Table II, wherein the amounts of the stated ingredients are given as parts by weight, and the reference legends identify the same suppliers as in Table I, unless otherwise noted.

TABLE II

|  | M | N | O | P | Q | R | S | T | U |
|---|---|---|---|---|---|---|---|---|---|
| Polyvinyl chloride [a] | 100 | 100 | 100 | 100 | 100 | 100 | 100 | 100 | 100 |
| Liquid plasticizer: |  |  |  |  |  |  |  |  |  |
| High mol. wt. epoxy-type [c] | 111 | 22.2 | 5 | 60 | 22 | 22 | 22 | 5 | 22 |
| Acetyltributyl citrate [d] |  | 35.5 | 36 |  | 36 | 36 | 36 | 45 | 36 |
| Alkylaryl phosphate [e] |  | 8.8 | 25 |  | 15 | 15 | 15 | 20 | 15 |
| Filler and colorant: |  |  |  |  |  |  |  |  |  |
| Titanium dioxide [f] | 11 | 13.3 | 15 | 7 | 13 | 10 | 10 | 10 | 10 |
| Lubricants |  |  |  | 21 |  | 13 |  | 13 | 13 |

NOTE.—For footnotes a, c, d, e, and f, see Table I.

In general, the stated ingredients of the formulations given in either Table I or Table II are mixed together; first, with a high-speed mixer to form an intimate mixture of the vinyl polymer and the liquid plasticizer; then, in a three-roll paint mill, adjusted to minimum clearance, to form a fine paste or dispersion of the vinyl polymer in the plasticizer.

The vinyl plastisol for forming the base layer or base gasket involves preferably a plasticizer system which contains little or none of the high molecular weight epoxy-type plasticizer. As noted from Table I, Examples E and F contain, respectively, 5 parts in 66 parts of total plasticizer and 5 parts in 75 parts of total plasticizer. Any appreciable increase in the amount of the high molecular weight epoxy-type would result in a bleeding or migration thereof into the vinyl enamel protective undercoat, causing it to separate from the metal during the baking step, and the affixing of the gasketed closure to the container.

Next, a sheet of metal or "blank," one surface of which has been previously "tinned" and coated with a baked-on enamel formed of a vinyl phenolic copolymer resin (marketed by Stoner Mudge Corporation) is located in a jig, whereupon a stencil screen is lowered into contact with the tinned and coated surface. The vinyl phenolic copolymer coating forms a protective coating or enamel to prevent contact between the metal closure and container contents. The coating is usually applied so as to measure about 0.0005 inch thickness. A surplus amount of a pasty vinyl plastisol according to any formulation of Table I is poured on the screen and a rubber-bladed "squeegee" is passed over the openings in the stencil screen, forcing some of the plastisol onto the "blank" below in the desired designs, usually either an annular design or complete circles. The screen is then retracted, whereupon the "blank" containing the first layer of vinyl plastisol is placed in an oven and baked to "flux" the plastisol. To fully flux the plastisol, the furnace is adjusted to 360° F. and the "blank" is maintained at this temperature for 2½ minutes. A similar degree of flux is obtained by a furnace temperature of 500° F. and retention therein for 30 seconds. Intermediate combinations of time and temperature in accordance with the above have been used.

To apply the second or top layer of vinyl plastisol, the "blank" containing the first layer or deposit is relocated in the jig, the stencil screen frame lowered, a surplus amount of any formulation of Table II spread on the screen, the squeegee passed over the openings, forcing some of the plastisol therethrough and onto the first layer, the screen retracted, and the blank bearing the second layer of designs in registry over the first layer of deposits inserted in the furnace for a repeat of the heat-fluxing cycle as described above. At the completion of the cycle, the "blank" with the fluxed-on stratified or two-layer gasket is allowed to cool, following which closure caps are formed by a mechanical pressing and stamping operation, which will not be described, and which forms no part of the present invention. Suffice it to say that the formation is such that the stratified gasket is located on the inner surface of the closure as illustrated in the drawings. The closures thus described are found to form an efficient hermetic seal when applied to glass containers. The gradient hardness character of the stratified gasket combines optimum sealing with the rim of the glass container with maximum resistance to cut-through, as the closures are mechanically applied under service conditions.

It has been found desirable in some instances to control the fluxing or curing cycle in such fashion that the base coating or gasket member is extremely hard. It has also been found desirable to achieve a gasket assembly of smoothly gradient hardness, e.g., a gradual uniform increase in hardness from surface to metal. To achieve this gradient hardness, the first layer of vinyl plastisol is exposed to a heating cycle somewhat less than outlined above as giving a definite flux. Thus, the first layer is heated for about 1½ minutes at 360° F., or for 30 seconds at 400° F. to 425° F. This will harden it sufficiently that a second layer can be applied without chance of smearing the design or clogging up the stencil, but the heat cycle will be less than that to effect a complete flux. Then, after the deposit of the second layer of vinyl plastisol, the "blank" is exposed to a full heating cycle, e.g., 30 seconds at 500° F., 2½ minutes at 360° F., or the equivalent thereof, whereupon both layers of vinyl plastisol will experience "flux," while, at the same time, there will be some intermingling, transference, or blending of ingredients (polymer and plasticizer) between the layers so that the ultimate gasket structure will approach being a single layer of gradient hardness rather than two separate layers of separate hardness.

The layers of vinyl plastisol are screened onto the "blank" as described above, preferably in such thickness as to yield a final thickness of from 0.003 inch to 0.006 inch. The layers can be of the same or different thickness, but usually it is preferred that the final gasket measure 0.006 inch to 0.012 inch in thickness. By way of contrast, it may be pointed out that the original undercoat of protective vinyl phenolic enamel, which forms no part of the present invention, measures 0.0005 inch in thickness.

The lubricant ingredient identified in Table II is included in order to impart an internal lubricating quality to the top gasket layer. Microcrystalline waxes and other similar materials can be used. The internal lubricating function is desirable in order to reduce the torque necessary to twist the closure from the closed, sealed position to the open position.

Example 1

To form a gasketed closure in accordance with the present invention, a rectangular sheet or "blank" of metal is first "tinned" on one surface. Then, a very fine (0.0005 inch) film of a Stoner Mudge vinyl phenolic copolymer resin is baked on the tinned surface. Next, a plastisol formulation conforming to A in Table I is prepared. The plastisol is of spreadable viscosity and is applied, by a screening technique using a squeegee, in the form of a plurality of spaced layers of annular configuration and measuring about 0.004 inch in thickness. The "blank" is then placed in an oven maintained at 360° F. for 1½ minutes. This heat cycle partially fluxes the plastisol so that it is relatively non-tacky, but not completely resistant to cut-through. Next, a plastisol formulation conforming to Q in Table II is prepared in similar fashion and applied by a screening technique over the previously applied annular layers composed of composition A to a total thickness of 0.009 inch. The "blank" sheet bearing the annular designs of double thickness is then reinserted in the oven and maintained therein for 2½ minutes at 390° F. This cycle effectively fluxes both layers. The "blank" is next introduced into automatic pressing and stamping machinery which forms the "blank" into a plurality of lug-type closures having a double-thickness annular gasket at the normally rim-contacting under surface thereof. The closures so formed are engageable with filled glass containers in commercial "filling" and "capping" operations. The closures provide very effective hermetic seals maintaining the hot process foods under vacuum conditions for eminently satisfactory periods of time. A statistical analysis of a large number of sealed containers using the gasketed closure of the present invention as compared to a like number of sealed containers using only one layer according to composition A, and a like number of sealed containers using only one layer according to composition Q, revealed that the performance was markedly superior to either. The closures using only the gasket according to composition Q were subject to separation from the top panel of the closure, resulting in loss of vacuum and contamination due thereto, and also due to metal contact with the acidic contents. In addition, the gasket, in a large number of cases, was actually cut by the rim of the container, leading to loss of vacuum. The closures using only the gasket according to composition A did not seal tightly, as the gasket was too hard to accommodate itself to the imperfections in the upper surface of the rim of the container.

Example 2

Other gasketed closures according to the invention are produced in the manner described in Example 1, using a base gasket layer according to formulation B of Table I, and a top gasket layer according to formulation U of Table II. The combination or stratified gasket-containing closure possessed all the advantageous features described in Example 1, as compared to closures having single layer gaskets of either formulation B or Q.

Gasketed closures of the invention, including a stratified gasket of gradient hardness, can be produced by any combination of base gaskets formulated of plastisols A—G in Table I, and the top or rim-contacting gaskets formulated of plastisols M—U of Table II. In all cases, the closure of double-gasket construction performed superior to closures employing only one gasket according to either the plastisol formulations of Table I or Table II.

Variations, modifications, and substitutions in the procedures and products described hereinabove are possible and will be apparent to those skilled in the art, and it is accordingly intended to include such within the spirit and scope of the invention as defined by the appended claims.

I claim:
1. A closure cap for use in establishing and maintaining a hermetic seal with a glass container by contact with an upwardly facing mouth-defining rim thereof, said cap comprising a cup-shaped shell including a generally flat top panel portion and a depending attaching skirt, and sealing gasket means of gradient hardness bonded to the interior of said closure cap, that portion of greatest hardness being in contact with said closure cap.

2. A closure cap of the top-seal type for use in establishing and maintaining a hermetic seal with a glass container by firm contact with an upwardly facing mouth-defining rim thereof, said cap comprising a cup-shaped shell including a generally flat top panel portion and a depending skirt portion, a base gasket integrally secured to the under surface of said flat top panel portion, and a top gasket heat-bonded to said base gasket and being soft relative to the base gasket for accommodating the irregular contour and imperfections in the said rim and hermetically sealing the container.

3. A closure cap of the top-seal type for use in establishing and maintaining a hermetic seal with a glass container by contact with an annular, upwardly facing mouth-defining rim thereof, said cap comprising a cup-shaped shell including a generally flat top panel portion and a depending skirt portion, and a stratified sealing gasket means integrally secured to the under surface of said flat top panel portion, said stratified gasket means including two separate layers of a fluxed plastisol of rubber-like character, said layers being of preselected different hardness, the first layer contacting the panel portion and being relatively hard to resist cut-through by said rim, and the second layer being relatively soft to provide an effective hermetic seal with the rim of the glass container.

4. A closure cap of the top-seal type for use in establishing and maintaining a hermetic seal with a glass container by contact with an annular, upwardly facing mouth-defining rim thereof, said cap comprising a cup-shaped shell including a generally flat top panel portion and a depending skirt portion, and a stratified sealing gasket means integrally secured to the under surface of said flat top panel portion, said stratified gasket means including two separate but integrally heat-bonded layers of a fluxed vinyl-base plastisol, said layers being of varied hardness, the first layer being relatively hard to resist cut-through by said rim, and the second layer being relatively soft to provide an effective hermetic seal with the rim of the glass container.

5. For use in a closure cap intended to hermetically seal a hollow receptacle having a continuous rim-like mouth-defining sealing surface, sealing means comprising a pair of ring-like gaskets bonded together in concentric relationship and that gasket intended for contact with said sealing surface being softer than the other gasket, said sealing means adapted to be bonded to the interior of the closure cap.

6. Sealing means as defined in claim 5, the gaskets each being formed of a vinyl-base plastisol.

7. A closure cap of the top-seal type for use in establishing and maintaining a hermetic seal with a glass container by contact with an upwardly facing mouth-defining rim thereof, said cap comprising a cup-shaped shell including a generally flat top panel portion and a depending attaching skirt, and sealing gasket means secured to the flat top panel portion internally of the cap, said sealing gasket means comprising two separate layers which are each formed of a vinyl-base plastisol, the layer in contact with said panel portion being of greater hardness than the second layer.

8. A closure cap according to claim 7, wherein each layer of said gasket is composed of a different effective proportion of vinyl resin to plasticizer for said vinyl, said proportion being selected to yield a base layer harder than the second layer, said layers being fluxed with at least partially common cure cycles, whereby said layers fuse to provide a gasket of gradient hardness.

9. A closure cap according to claim 7, wherein each of the gasket layers has a thickness of from 0.003 inch to 0.006 inch.

References Cited in the file of this patent

UNITED STATES PATENTS

| | | |
|---|---|---|
| 2,299,805 | Denman | Oct. 27, 1942 |
| 2,516,647 | Rogers et al. | July 25, 1950 |
| 2,654,913 | Maier | Oct. 13, 1953 |
| 2,663,908 | Maier et al. | Dec. 29, 1953 |
| 2,714,076 | Seckel | July 26, 1955 |
| 2,796,189 | Cooke et al. | June 18, 1957 |
| 2,827,192 | Warth | Mar. 18, 1958 |
| 2,880,900 | Foye | Apr. 7, 1959 |
| 2,880,901 | Zipper et al. | Apr. 7, 1959 |
| 2,912,400 | Olson | Nov. 10, 1959 |

FOREIGN PATENTS

| | | |
|---|---|---|
| 856,767 | France | Apr. 1, 1940 |
| 810,786 | Great Britain | Mar. 25, 1959 |